United States Patent [19]
Akin, Jr. et al.

[11] 3,744,872
[45] July 10, 1973

[54] BINOCULAR WITH IMPROVED PRISM MOUNT

[75] Inventors: Alfred A. Akin, Jr., West Covina; David P. Bushnell, Altadena, both of Calif.

[73] Assignee: Bushnell Optical Corporation, Pasadena, Calif.

[22] Filed: May 28, 1971

[21] Appl. No.: 148,032

Related U.S. Application Data
[63] Continuation-in-part of Ser. No. 70,686, Sept. 9, 1970, abandoned.

[52] U.S. Cl. .................. 350/36, 350/51, 350/287
[51] Int. Cl. .................. G02b 21/20, G02b 7/18
[58] Field of Search .................. 350/36, 51, 287

[56] References Cited
UNITED STATES PATENTS

| | | | |
|---|---|---|---|
| 1,358,721 | 11/1920 | Fujii | 350/36 UX |
| 1,533,248 | 4/1925 | Harwix | 350/287 |
| 2,430,779 | 11/1947 | Peck et al. | 350/287 |
| 2,553,329 | 5/1951 | Perkins | 350/287 |
| 1,364,381 | 1/1921 | Kent | 350/36 X |

*Primary Examiner*—David H. Rubin
*Attorney*—Christie, Parker & Hale

[57] ABSTRACT

A prism binocular with molded hollow body housings each having a preformed shelf or seat to receive a first prism in optical alignment behind an objective lens. The prism is clamped in place by a block which carries a second prism positioned ahead of an ocular lens. The block is secured to the housing interior, and is movable to provide a coarse collimation adjustment during assembly of the binocular. A cover panel is fitted over the front of the housing and includes an integrally formed light shield extending toward the first prism. The ocular lens has a rapid-focus adjustment, and fine collimation is provided by adjustment screws which hold the objective lens in a mounting tube on the cover panel.

6 Claims, 16 Drawing Figures

PATENTED JUL 10 1973
3,744,872
SHEET 1 OF 3
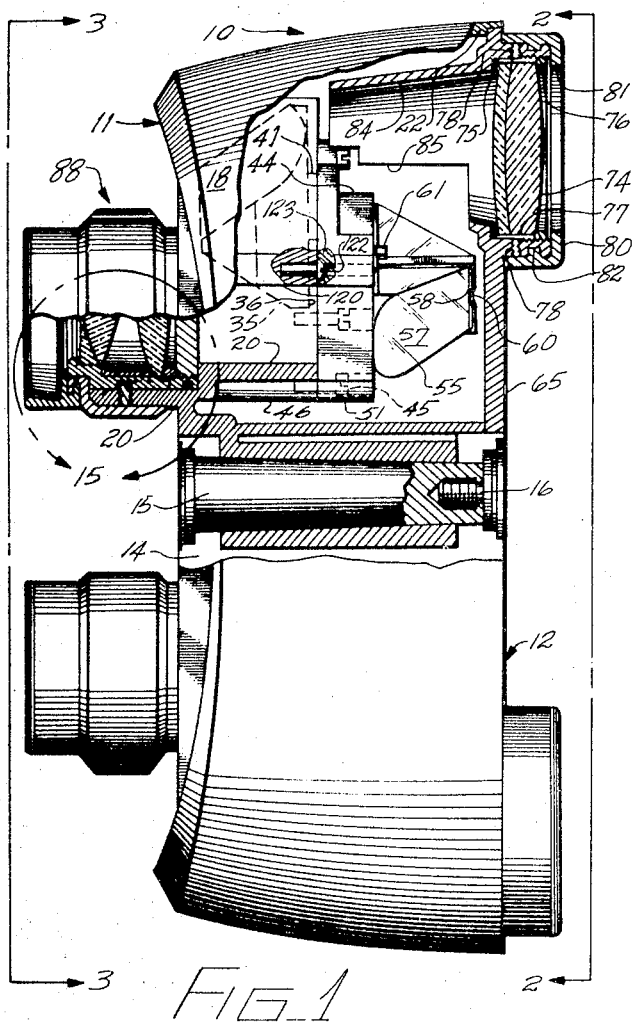
FIG_1
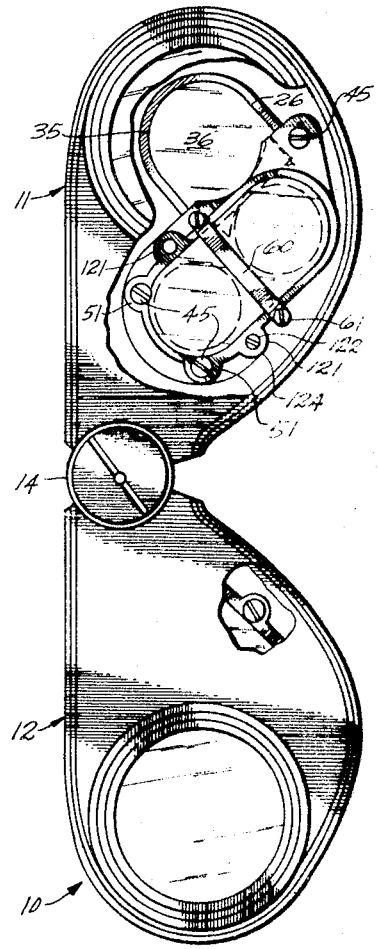
FIG_2
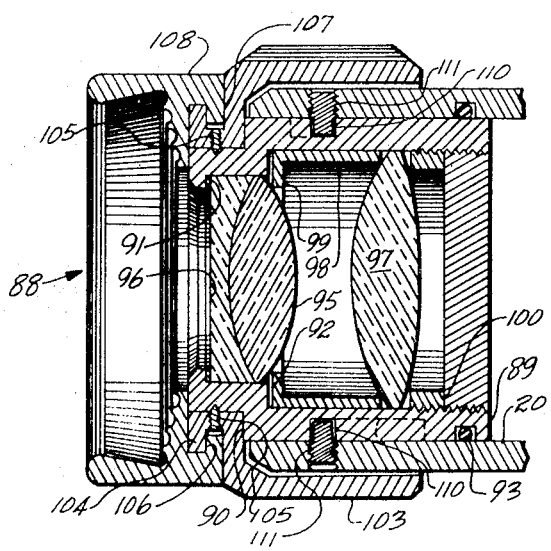
FIG_15
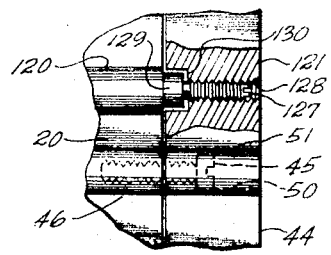
FIG_16
INVENTOR.
ALFRED A. AKIN, JR.
DAVID P. BUSHNELL
BY
Christie, Parker & Hale
ATTORNEYS

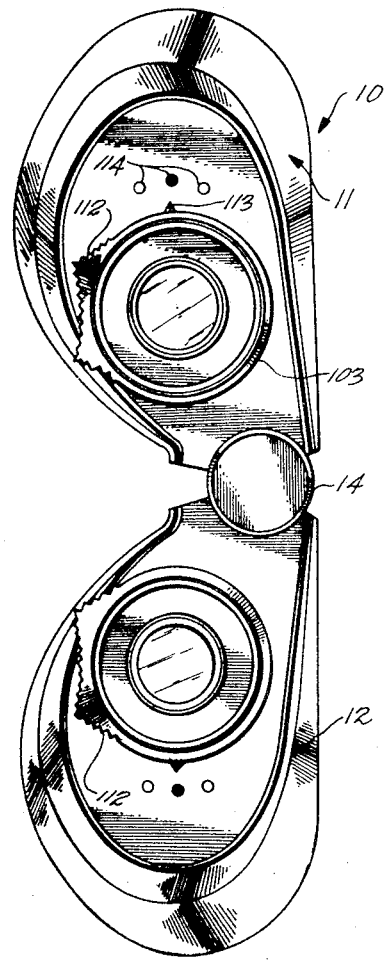
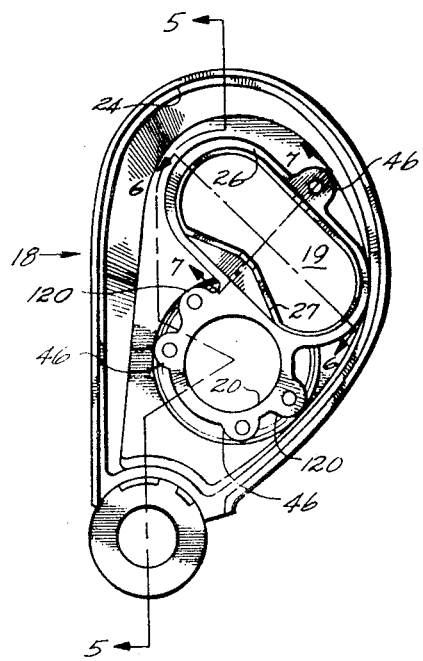
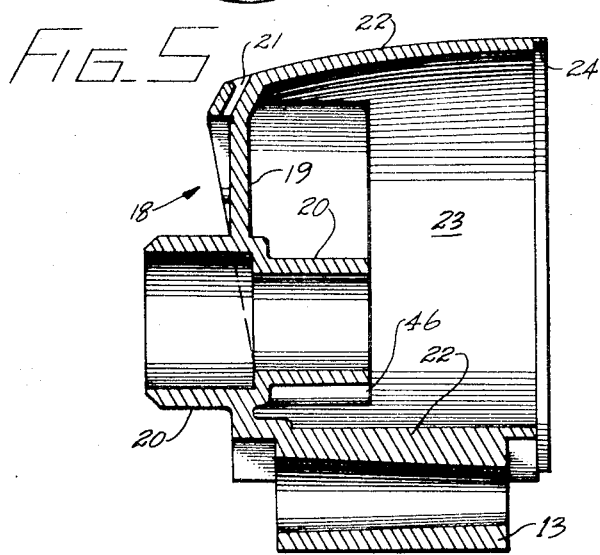
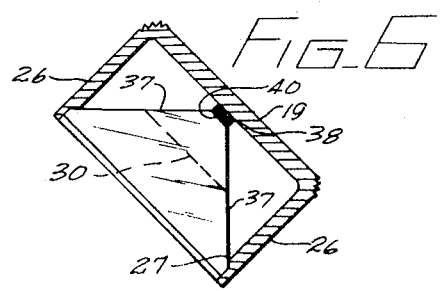
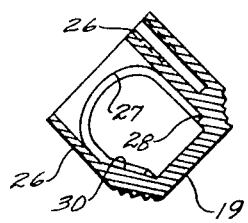

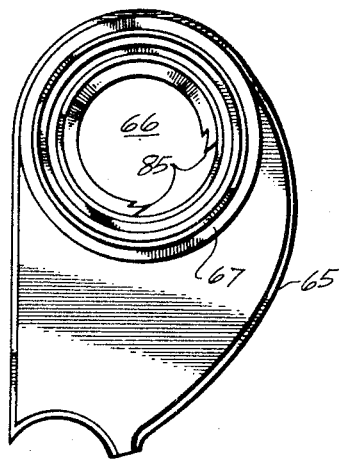
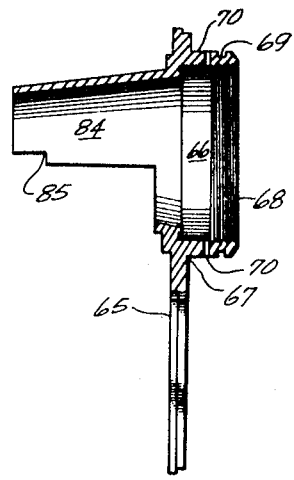
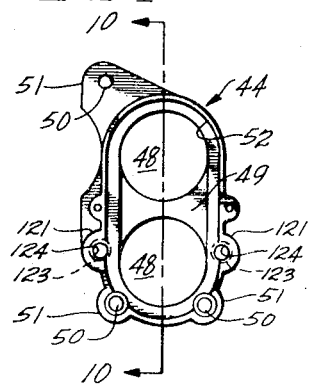
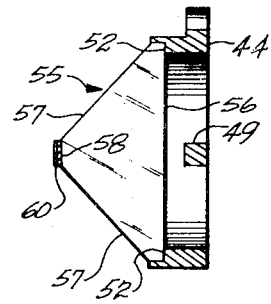
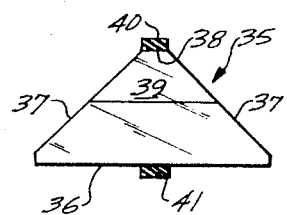
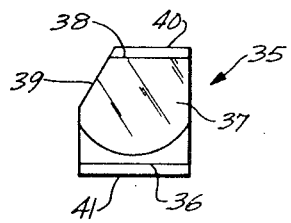
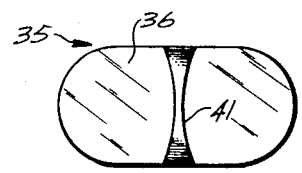

BINOCULAR WITH IMPROVED PRISM MOUNT

CROSS REFERENCE TO RELATED APPLICATION

This is a continuation-in-part of my co-pending application Ser. No. 70,686 filed Sept. 9, 1970, now abandoned.

BACKGROUND OF THE INVENTION

Prism binoculars have been in use for many years, and are typically constructed as a hinged body carrying a pair of monocular telescopes which are movable with respect to each other to provide an interpupillary spacing adjustment. Each monocular has ocular and objective lenses, and a pair of prisms provide a folded optical path between the lenses. The prisms and lenses must be set and maintained in precise alignment or collimation to prevent eye strain, and to provide an accurate image of a scene being viewed. Mounting mechanisms used in the past for holding the prisms and lenses have been expensive and complex to assemble and adjust, and these factors have limited the development of low-cost prism binoculars having satisfactory optical quality.

The binocular of this invention uses molded body housings which have a preformed seat for receiving and aligning one of the two prisms in each monocular. The other prism is held on a block which is adjustably supported within the housing to clamp the seated prism in place. This construction simplifies assembly of the binocular, and provides a rugged unit which can withstand shock and mishandling without loss of optical alignment. Each objective lens is carried in a tube integrally formed on a panel which covers the front of the housing, and the ocular lens is held in a focusing assembly movably mounted on a tube extending rearwardly from the housing. The binocular is designed to minimize component cost and assembly time, but without sacrificing optical quality and ruggedness.

SUMMARY OF THE INVENTION

Briefly stated, this invention relates to an improved monocular body assembly for a prism binocular having a pair of monoculars each having ocular and objective lenses. First and second prisms are positioned in an optical path between the lenses, each prism having a front face through which light enters and exits, and a pair of internally reflecting rear faces.

The improved monocular body includes a hollow housing adapted to support the ocular lens, and having on its inner surface an integral hollow boss or forwardly extending wall which defines a recessed shoulder forming a prism seat. The rear faces of the first prism have peripheral edges positioned against and optically aligned by the seat. A mounting block is secured within the housing, and the block supports the second prism in optical alignment with the first prism and ocular lens. A cover member is secured to the housing to enclose the prisms within the housing, and to support the objective lens in optical alignment with the first prism.

Preferably, the mounting block is positioned over and secured to the hollow boss with the two prisms being disposed on opposite sides of the block at maximum separation. An adjustment means is provided between the mounting block and boss to permit repositioning of the second prism for rough collimation during assembly. The first prism is cushioned against shock by a resilient pad positioned between the prism and a floor of the boss, and a second resilient pad positioned between the prism and mounting block.

Preferably, the hollow housing includes focus means for movably supporting the ocular lens, the means having a focus ring which is rotatable to focus the monocular by moving the ocular lens along its optical axis. The focus rings of the two monoculars rotate in opposite directions to move the ocular lenses in the same direction along the respective optical axes. That is, the focus rings are moved in opposite directions to shift both lenses, for example, from a near-object focus to a distant-object focus. The cover member of the monocular housing includes a hollow tube in which the objective lens is mounted, and a plurality of angularly spaced alignment screws are threaded through the tube to bear on the objective lens. Lateral shifting of the objective lens during alignment of the monocular optics is achieved by differential adjustment of the screws.

BRIEF DESCRIPTION OF THE DRAWINGS

FIG. 1 is a top view, partly in section, of a binocular according to the invention;

FIG. 2 is a front view, partly broken away, of the binocular;

FIG. 3 is a rear view of the binocular;

FIG. 4 is a front view of a left-hand monocular housing with optics removed;

FIG. 5 is a view on line 5—5 of FIG. 4;

FIG. 6 is a view on line 6—6 of FIG. 4;

FIG. 7 is a view on line 7—7 of FIG. 4;

FIG. 8 is a front view of a front cover panel and light shield;

FIG. 9 is a side view, partly in section, of the cover panel shown in FIG. 8;

FIG. 10 is a sectional side elevation on line 10—10 of FIG. 11, of a prism and prism block;

FIG. 11 is a front view of the prism block with the prism removed;

FIG. 12 is a side view of a Porro prism and associated pads;

FIG. 13 is an end view of the prism;

FIG. 14 is a front view of the prism;

FIG. 15 is an enlarged sectional elevation of a focusing eyepiece assembly; and

FIG. 16 is a view similar to FIG. 1 but restricted to a portion of an alternative prism block and monocular housing.

DETAILED DESCRIPTION OF THE PREFERRED EMBODIMENT

A prism binocular 10 is shown in FIGS. 1–3, and includes a pair of monoculars 11 and 12 having hinge portions 13 and 14 respectively which are interfitted and secured together by a hinge pin 15 held in place by a lock screw 16. Monoculars 11 and 12 are substantially identical (with the exception of a reversal of parts associated with the prisms and other optical components in the folded optical system of each monocular), and only monocular 11 need be described in detail.

Monocular 11 has a hollow housing 18 shown in detail in FIGS. 4–7. Housing 18 has a rear wall 19 with an integrally formed, inwardly stepped ocular tube 20 extending therethrough. A slot 21 (FIG. 5) is formed through a thickened portion of rear wall 19 adjacent its outer edge to provide an anchor for a neckstrap (not shown).

A continuous sidewall 22 extends forwardly from rear wall 19, and partially encloses a space 23 in which a pair of prisms are positioned as described below. The front edge of sidewall 22 is recessed to define a shoulder 24.

A generally oval or racetrack-shaped inner wall 26 extends forwardly from rear wall 19, and is integrally formed with the rear wall as well as with portions of ocular tube 20 and sidewall 22 to define a prism-receiving hollow boss. As shown in FIG. 4, the long axis of oval inner wall 26 is oriented at approximately 45° to the top surface of the monocular housing.

The inner surface of wall 26 defines a shallow (about 0.8 mm in width) inwardly extending shoulder or shelf 27. As shown in FIGS. 4 and 6–7, shelf 27 is spaced slightly rearwardly of the front edge of wall 26 at its curved ends, and extends rearwardly toward rear wall 19 to a flat portion 28 (FIG. 7) at the center of the straight portion of the inner wall and spaced slightly forward of rear wall 19. Preferably, the inner surface of wall 26 adjacent ocular tube 20 has an inwardly sloping portion 30 (FIG. 7) to strengthen this portion of the structure. Walls 19, 22 and 26, and ocular tube 20 are integrally formed so housing 18 is a single molded member.

A conventional upper or first Porro prism 35 (FIGS. 12–14) has a generally oval-shaped front face 36, and a pair of perpendicularly oriented rear faces 37 extending at 45° angles to the front face and toward each other to a flat rectangular base 38. One side of the prism defines a chamfered portion 39 to provide clearance for sloping portion 30 when the prism is installed within inner wall 26 of the monocular housing.

A first rectangular pad 40 is positioned on base 38 of the prism, and a second inwardly tapering pad 41 is centrally positioned on front face 36. The pads can be secured to the prism with a drop of cement for ease of handling. The pads are made of a resilient material such as 30-shore neoprene.

Referring to FIGS. 1, 2 and 6, first prism 35 is positioned within inner wall 26 with the peripheral edges of rear faces 37 and base 38 seated firmly against shelf 27. The V-shaped shelf forces the prism into correct alignment as the prism is gently tapped into place. Resilient pad 40 is positioned between the inner surface of rear wall 19 and base 38 of the prism to protect the prism if the binoculars are dropped or otherwise abused.

A mounting block 44 is secured over a portion of front face 36 of prism 35 (see FIG. 2), and is held in place by screws 45 threaded into mating holes in bosses 46 on the outer surfaces of ocular tube 20 and wall 26. Pins or dowels (not shown) can be provided on block 44 to fit into mating sockets (not shown) in ocular tube 20 or wall 26 to insure correct alignment of the block. Pad 41 is compressed between the front face of prism 35 and the rear surface of block 44 to clamp the prism against shelf 27.

Block 44 (FIGS. 10 and 11) is generally oval in planform, and has a pair of circular light-passage openings 48 formed therethrough. A web 49 extends across the block between the openings. Counterbored clearance holes 50 for screws 45 are formed through bosses 51 on the periphery of the block. The front surface of the block is recessed to define an oval shoulder 52 which extends around circular openings 48.

A lower or second Porro prism 55 has a front face 56, rear faces 57, and a base 58. This second prism is identical in geometry to first prism 35 but can be slightly smaller in size as the conical bundle of light rays passing through the optical system decreases in diameter between the first and second prisms. Second prism 55 is positioned on block 44 with the periphery of front face 56 seated against oval shoulder 52 of the block. The prism is secured in place by a U-shaped metal (phosphor bronze) clamp 60 which is urged against base 58 of the prism and secured in place by screws 61 threaded into the block.

Prisms 35 and 55 are spaced apart by block 44 as far as possible within the confines of housing 18. The rearward location of prism 35 and forward location of prism 55 positions these components in relatively narrow (as compared to conventional binoculars in which the prisms are mounted face to face) regions of the conical bundle of light rays passing through the instrument. The prisms can therefore be smaller and lighter than corresponding prisms used in conventional designs.

A front panel 65 (FIGS. 1 and 8–9) extends across the front of sidewall 22 to enclose housing 18. Panel 65 is fitted against shoulder 24 of the housing sidewall, and is cemented in place. Alternatively, these parts can be bonded to each other using ultrasonic-welding techniques. A circular opening 66 extends through panel 65, and an objective-lens mounting tube 67 extends around the hole and forwardly from the panel. An annular groove 68 is formed in the panel at the base of tube 67, and a second peripheral groove 69 extends around tube 67 adjacent its forward end. Four threaded openings 70 extend through the wall of the mounting tube, and these openings are evenly spaced 90° apart around the tube.

A conventional objective lens 74 (FIG. 1) is positioned within mounting tube 67 against an O-ring 75 seated in groove 68. An externally threaded locking ring 76 is threaded into internal threads formed on the inner surface of tube 67 to lock the objective lens in place. A thin metal band 77 of a material such as soft aluminum extends around the edge of the objective lens, and set screws 78 are threaded through openings 70 in the mounting tube to bear against band 77. The lens can be shifted laterally during collimation of the monocular by adjusting set screws 78.

A circular cap 80 (FIG. 1) has a central opening 81 in front of the objective lens, and is fitted over mounting tube 67. The cap has an inwardly extending annular rib 82 which fits into groove 69 to hold the cap on the tube. Cap 80 is made of a flexible material such as neoprene which can be slightly deformed when rib 82 is forced over the front of the mounting tube during installation of the cap.

A generally conical light shield 84 is integral with front panel 65 and extends rearwardly from the panel around opening 66. A portion of the light shield is cut away to define a stepped notch 85 which provides a clearance space for mounting block 44 as shown in FIG. 1. The inner surface of the light shield is black in color, and it prevents stray reflections within the housing which could interfere with image quality.

A focusing eyepiece assembly 88 is rotatably mounted on ocular tube 20 as best seen in FIG. 15. The assembly includes a tubular lens cell 89 making a slip fit within tube 20. Cell 89 is reduced in outside diameter adjacent its rear end to define an annular shoulder 90, and the inner surface of the cell defines a pair of annular shoulders 91 and 92 on opposite sides of shoulder 90. An O-ring seal 93 is seated in an annular groove in the outer surface of the cell adjacent its forward end, and the seal prevents entry of dust or moisture into the monocular housing interior.

A conventional compound ocular lens 95 is seated within cell 89 against a gasket 96 on shoulder 91. A field lens 97 is air-spaced forwardly of lens 95 by an annular spacer 98 having an inwardly turned lip 99 at its rear end which bears on and clamps lens 95 against gasket 96. A retaining ring 100 is threaded into the forward end of lens cell 89 to secure the field lens against the spacer.

A focus ring 103 fits loosely over ocular tube 20, and is reduced in diameter at its rear end to define a circular portion 104 fitted snugly over the end of cell 89 to abut shoulder 90. The focus ring is rigidly secured to cell 89 by four pointed set screws 105 threaded into and spaced evenly around the ring to extend into shallow sockets in the cell. An annular groove 106 in the outer surface of portion 104 provides a seat for an inwardly extending retaining rib 107 on an annular eyecup 108 extending from the rear end of the focus ring. The eyecup is made of an elastomer such as neoprene which will stretch sufficiently for rib 107 to pass over the end of the focus ring and seat in groove 106.

A pair of cam slots 110 are formed on opposite sides of and partially through the wall of cell 89. A pair of guide pins 111 are threaded into the cell to mate with cam slots 110. Each cam slot extends about 90° around the lens cell, and the slots are sufficiently steep that the ocular lens is moved along its axis through a full focusing range (for both near and distant objects) within the length of the cam slots as the focus ring is rotated about 90° or less. This style of fast-focusing mechanism is further described in U.S. Pat. No. 3,540,792.

A knurled focusing knob 112 (FIG. 3) is formed on the surface of focus ring 103, and a pointer 113 on the focus ring indicates focus position of the ocular ring with respect to distance-scale markings 114 on rear wall 19 of the monocular housing. Preferably, the focusing cam slots on monoculars 11 and 12 are oppositely oriented so the ocular lenses are driven in the same direction along their parallel optical axes by opposite rotation of the respective focus rings. This has been found to be an effective and natural way of achieving rapid and accurate focus of the two monoculars, and knobs 112 are positioned to fall under the user's thumbs when the binoculars are held normally so a shift in hand position is not required during refocusing.

Housing 18, mounting block 44, front panel 65, lens cell 89 and focus ring 103 are preferably each integrally molded from a plastic material such as ABS (acrylonitrile, butadiene and styrene) resin with about 40-percent glass fibers as a filler. This material is lightweight and strong, and provides a finished product with an attractive appearance.

The alignment latitude afforded by set screws 78 which shift the objective lens is a relatively fine adjustment, and it may be desirable to provide a second coarse collimation adjustment to permit rough optical alignment during assembly of the various components. This is most easily achieved by incorporating an adjustment means for shifting the position of mounting block 44 so second prism 55 can be tipped slightly for rough alignment before the front panel and objective lens are secured in place.

One form of a suitable coarse adjustment is shown in FIGS. 1, 2, 4 and 5. An additional pair of bosses 120 are formed on ocular tube 20 in alignment with a matching pair of bosses 121 on mounting block 44. A pair of self-tapping screws 122 are threaded into holes in bosses 120, and the heads of the screws fit into recesses 123 in the undersurface of bosses 121. A small-diameter hole 124 is drilled through each boss 121 into recess 123 so the heads of screws 122 can be rotated with a small screwdriver (not shown).

If any significant prism misalignment is noted during assembly, either or both of screws 122 is rotated to back the screw head slightly away from boss 120 and against mounting block 44 to space the block slightly away from the ocular tube. Tipping of prism 55 along its long axis results from equal adjustment of screws 122, and tipping along the short or lateral axis of the prism is achieved by differential adjustment of the screws. Screws 45 are tightened to secure the mounting block once the desired coarse alignment is achieved, and final post-assembly collimation is done by adjusting the objective lens with setscrews 78.

An alternative arrangement is shown in FIG. 16 where the holes in bosses 120 are omitted, and a slotted-head set-screw 127 is threaded into holes 128 in each of bosses 121. An enlarged pad 129 is formed on the inner end of each setscrew 127, and the pad seats in a clearance recess 130 at the inner end of hole 128. Advancing rotation of either setscrew forces the setscrew pad against the top of facing boss 120 to space the mounting block away from the ocular tube. Uniform or differential adjustment of the setscrews is made until the desired coarse prism alignment is achieved. The components are locked in place by tightening screws 45, and the alignment is preserved by locking setscrews against further movement with a drop of cement.

Conventional setscrews (not shown) can also be used instead of pad-end setscrews 127, but it is then desirable to put a metal insert in facing boss 120 to distribute the load across the boss and keep the narrow end of the setscrew from digging into the plastic material which forms boss 120. Whichever arrangement is selected, the screws are in effect acting as adjustable spacers to permit quick coarse adjustment of prism 55 as an inital step in collimating the binocular optics.

There has been described a low-cost prism binocular which is made primarily of inexpensive, lightweight moleded-plastic parts which can be assembled by relatively unskilled workers. The binocular is substantially sealed and will float if accidentally dropped in water. Elimination of conventional prism-mounting mechanisms provides simplified assembly and improved resistance to shock forces which might break or misalign the prisms of conventional designs.

What is claimed is:

1. In a prism binocular having a pair of monoculars each including ocular and objective lenses, and first and second prisms positioned in an optical path between the lenses; each prism having a front face through which light enters and exits, and a pair of rear faces, an improved monocular body assembly for each monocular comprising:

a hollow housing adapted to support the ocular lens and having on its inner surface an integral hollow boss forming a recessed prism seat, the rear faces of the first prism having peripheral edges positioned against and aligned by the seat;

a mounting block secured within the housing and adapted to receive and support the second prism in optical alignment with the first prism and the ocular lens;

adjustment means in contact with the mounting block and arranged to provide an adjustable separation of the mounting block and hollow boss so the position of the second prism can be varied during optical alignment of the monocular; and a cover member secured to the housing to enclose the prisms within the housing, the cover member being adapted to support the objective lens in optical alignment with the first prism.

2. The improvement defined in claim 1 in which the mounting block is positioned over and secured to the hollow boss, the prisms being disposed on opposite sides of the block.

3. The improvement defined in claim 2 and further comprising a resilient pad disposed between the first prism and the boss, and a second resilient pad disposed between the first prism and mounting block.

4. The improvement defined in claim 1 in which the hollow housing includes focus means for movably supporting the ocular lens, the focus means having a focus ring which is rotatable to focus the monocular by moving the ocular lens along its optical axis, the focus rings of the two monoculars being arranged to rotate in opposite directions to move the ocular lenses in the same direction along the respective optical axes.

5. The improvement defined in claim 4 in which the mounting block is positioned over and secured to the hollow boss, the prisms being positioned on opposite sides of the block, and further comprising a resilient pad disposed between the first prism and the boss, and a second resilient pad disposed between the first prism and mounting block.

6. The improvement defined in claim 5 in which the adjustment means comprises a pair of screws disposed between and arranged for adjustable separation of the block and boss so relative position of the prisms is adjustable.

* * * * *

PO-1050
(5/69)

UNITED STATES PATENT OFFICE
CERTIFICATE OF CORRECTION

Patent No. 3,744,872            Dated July 10, 1973

Inventor(s) Alfred A. Akin, Jr. and David P. Bushnell

It is certified that error appears in the above-identified patent and that said Letters Patent are hereby corrected as shown below:

On the cover sheet, item 73 "Bushnell Optical Company, Pasadena, California" should read --Bausch & Lomb Incorporated, Rochester, New York--

Signed and sealed this 27th day of November 1973.

(SEAL)
Attest:

EDWARD M. FLETCHER, JR.
Attesting Officer

RENE D. TEGTMEYER
Acting Commissioner of Patents